(12) United States Patent
Yanagibayashi et al.

(10) Patent No.: US 12,173,834 B2
(45) Date of Patent: Dec. 24, 2024

(54) BIOINERT PIPE WITH HOLLOW MEMBER ACCEPTING A METAL TUBE AND LIQUID CHROMATOGRAPH

(71) Applicant: SHIMADZU CORPORATION, Kyoto (JP)

(72) Inventors: Jun Yanagibayashi, Kyoto (JP); Shinji Tanaka, Kyoto (JP); Ryo Hosono, Kyoto (JP); Kenichi Yasunaga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 405 days.

(21) Appl. No.: 17/726,082

(22) Filed: Apr. 21, 2022

(65) Prior Publication Data
US 2022/0356964 A1 Nov. 10, 2022

(30) Foreign Application Priority Data
May 10, 2021 (JP) .................................. 2021-079560

(51) Int. Cl.
*F16L 9/147* (2006.01)
*G01N 30/38* (2006.01)

(52) U.S. Cl.
CPC .............. *F16L 9/147* (2013.01); *G01N 30/38* (2013.01)

(58) Field of Classification Search
CPC . F16L 9/147; G01N 30/38; G01N 2030/8813; G01N 30/60
See application file for complete search history.

(56) References Cited

U.S. PATENT DOCUMENTS

| 9,056,264 B2 | 6/2015 | Hahn |
| 9,494,563 B2 | 11/2016 | Falk-Jordan |

(Continued)

FOREIGN PATENT DOCUMENTS

| CN | 103823002 A | 5/2014 | |
| CN | 107940124 A | * 4/2018 | .............. F16L 41/10 |

(Continued)

OTHER PUBLICATIONS

Office Action for corresponding Chinese Patent Application No. 202210327646.5 dated Sep. 4, 2023, with English machine translation.

(Continued)

*Primary Examiner* — Eric S. McCall
*Assistant Examiner* — Timothy P Graves
(74) *Attorney, Agent, or Firm* — Renner, Otto, Boisselle & Sklar, LLP

(57) ABSTRACT

A bioinert pipe includes a flow path inside, an inner wall of the flow path is composed of a resin tube and an outer peripheral surface of the resin tube is covered with a metal tube. The bioinert pipe includes an end portion extension member attached to an end portion of the metal tube, and the end portion extension member is made from a material harder than the resin tube and has a first surface and a second surface. The first surface is facing and in contact with an end surface of the metal tube and the second surface is directed opposite to the first surface. a through hole having an inner diameter substantially the same as an inner diameter of the metal tube is provided so as to pass from the first surface to the second surface in the end portion extension member. An edge of the through hole on the second surface of the end portion extension member has a chamfered shape, and the resin tube is inserted into the through hole. An end portion of the resin tube forms a flange portion by being by being (Continued)

bent outward in a radial direction of the flow path along the chamfered shape of the edge of the through hole.

3 Claims, 1 Drawing Sheet

(56) References Cited

U.S. PATENT DOCUMENTS

| | | |
|---|---|---|
| 10,018,604 B2 | 7/2018 | Burger |
| 2012/0024411 A1 | 2/2012 | Hahn et al. |
| 2013/0298647 A1* | 11/2013 | Falk-Jordan .......... F16L 19/061 285/99 |
| 2014/0131997 A1 | 5/2014 | Burger et al. |
| 2016/0116088 A1 | 4/2016 | Graham |

FOREIGN PATENT DOCUMENTS

| | | |
|---|---|---|
| JP | S62115175 U | 7/1987 |
| JP | 2013-536417 A | 9/2013 |
| JP | 2014-098694 A | 5/2014 |
| WO | 2012/021596 A1 | 2/2012 |

OTHER PUBLICATIONS

Office Action for corresponding Japanese Patent Application No. 2021-079560 dispatched Feb. 20, 2024, with English machine translation.

Office Action for corresponding Chinese Patent Application No. 202210327646.5 dispatched May 23, 2024, with English machine translation.

* cited by examiner

BIOINERT PIPE WITH HOLLOW MEMBER ACCEPTING A METAL TUBE AND LIQUID CHROMATOGRAPH

BACKGROUND OF THE INVENTION

1. Field of the Invention

The present invention relates to a bioinert pipe used as pipes of an analysis device such as a liquid chromatograph.

2. Description of the Related Art

A liquid chromatograph (hereinafter, LC) is configured by connecting constituent elements such as a liquid delivery pump, an injector, a column, and a detector by a pipe. Since mechanical strength is particularly required for a portion constituting a path through which a mobile phase flows in a high pressure state, a metal material is generally used for the portion.

In contrast, a sample may contain a component that interacts with metal. For example, in addition to components such as protein, peptide, and nucleic acid, a specific type of an agrochemical component forms a complex with metal and strongly interact with the metal. For this reason, when a sample containing such a component comes into contact with metal, the component interacts with the metal to generate adsorption, which may cause an undesirable effect such as tailing of a component peak in a chromatogram, a decrease in detection sensitivity, or no detection of the component at all.

For this reason, it has been proposed that metal be not used for a wetted portion of an injector, a column, a detector, and a pipe, and only a low adsorptive material such as resin and ceramic be used. According to the proposed method, since a component in a sample does not come into contact with metal while flowing inside the injector, column, detector, and pipe, the risk of the adsorption as described above and a resulting undesirable effect can be reduced.

As described above, an LC system in which no metal is present in a wetted portion with a sample is referred to as a bioinert LC. As a pipe used for the bioinert LC, a bioinert pipe in which the outer side of a resin tube is covered with a metal tube to improve mechanical strength while suppressing adsorption of a sample inside the pipe has been proposed (see JP S62-115175 Y, U.S. Pat. No. 9,056,264B2, US2016/116088A1, U.S. Pat. Nos. 10,018,604B2, and 9,494,563B2).

SUMMARY OF THE INVENTION

The bioinert pipe is used in an analysis device, and is generally formed by using a metal tube, inserting a resin tube inside the metal tube, and fixing an end portion of the resin tube to a side surface of the metal tube in both end portions of the bioinert pipe. A flange portion made from resin is often provided in an end portion of the bioinert pipe. The flange portion functions as a sealing member for maintaining liquid tightness in a pipe connection portion by coming into contact with a bottom surface of a connection destination port to which the bioinert pipe is fixed. The flange portion can be formed by inserting the resin tube into the metal tube, then softening an end portion of the resin tube protruding from an end surface of the metal tube by applying heat from the outside, and bending the end portion in the circumferential direction along an edge of the opening of the metal tube.

In a case where a bioinert pipe is used as a pipe of an LC, an end portion of the bioinert pipe needs to maintain necessary sealing performance even after at least several tens of times of attachment and detachment. However, in a conventional bioinert pipe, there has been a case where load is applied to an opening portion of the flange portion at a resin tube end portion and the bioinert pipe is damaged during repeated attachment and detachment, and necessary sealing performance cannot be exhibited.

The present invention is made in view of the above problem, and an object of the present invention is to improve durability of sealing performance at the time of pipe connection at an end portion of a bioinert pipe.

A bioinert pipe according to the present invention is a bioinert pipe used in an analysis device and including a flow path inside, an inner wall of the flow path being composed of a resin tube and an outer peripheral surface of the resin tube being covered with a metal tube. The bioinert pipe includes an end portion extension member attached to an end portion of the metal tube, the end portion extension member is made from a material harder than the resin tube and has a first surface and a second surface, the first surface of the end portion extension member is facing and in contact with an end surface of the metal tube and the second surface is directed opposite to the first surface, a through hole having an inner diameter substantially the same as an inner diameter of the metal tube is provided so as to pass from the first surface to the second surface in the end portion extension member. An edge of the through hole on the second surface of the end portion extension member has a chamfered shape, and the resin tube is inserted into the through hole of the end portion extension member, and an end portion of the resin tube forms a flange portion by being by being bent outward in a radial direction of the flow path along the chamfered shape of the edge of the through hole of the second surface of the end portion extension member.

That is, in the present invention, an end portion of the metal tube is extended by the end portion extension member made from a material harder than the resin tube, the resin tube is inserted into the metal tube and the through hole provided on the end portion extension member, an edge of the through hole on the second surface facing the opposite side to the metal tube of the end portion extension member is chamfered, and an end portion of the resin tube protruding from the second surface of the end portion extension member is bent along the chamfered shape of the edge of the through hole, so that the flange portion is formed in an end portion of the bioinert pipe. As described above, since an end portion of the resin tube constituting the flange portion is bent along the chamfered shape of the edge of the through hole of the end portion extension member, load when the flange portion is pressed against a bottom surface of the connection destination port is less likely to concentrate on a specific portion, and breakage of the flange portion is suppressed. Furthermore, since the flange portion is supported by the end portion extension member made from a material harder than the resin tube, it is possible to cause the flange portion to maintain required pressure resistance performance, and as a result, it is possible to suppress deterioration of sealing performance.

Even if the end portion extension member as described above is not used, if the edge of the opening of the end surface of the metal tube is chamfered, it is considered that a configuration equivalent to that of the present invention is obtained. Such a configuration is disclosed in FIGS. 2 and 5 to 7 of U.S. Pat. No. 10,018,604B2. However, since a pipe used in a high-speed LC has a very small inner diameter, it is not easy to accurately perform such processing on the metal tube, which may lead to an increase in cost.

Further, FIGS. 3 and 4 of U.S. Pat. No. 10,018,604B2 also disclose a structure in which an edge of an opening of a sealing member provided in an end portion of a metal tube is chamfered, and an end portion of a resin tube formed along the chamfered shape to form a flange portion. However, the sealing member is a resin member such as polyether ether ketone (PEEK), and the flange portion is supported by a resin sealing member. In such a structure, it is difficult to say that sufficient pressure resistance performance can be maintained at a connection portion to a connection destination port. Then, in U.S. Pat. No. 10,018,604B2, there is no discussion on the deterioration of the durability of sealing performance due to concentration of load acting on the flange portion and a material of the member supporting the flange portion.

According to the bioinert pipe according to the present invention, since an end portion of the resin tube constituting the flange portion is bent along an R shape or a tapered shape of the edge of the through hole of the end portion extension member, load when the flange portion is pressed against a bottom surface of the connection destination port is less likely to concentrate on a specific portion, and breakage of the flange portion is suppressed. Furthermore, since the flange portion is supported by the end portion extension member made from a material harder than the resin tube, it is possible to cause the flange portion to maintain required pressure resistance performance. This improves the durability of the sealing performance at the time of pipe connection at an end portion of the bioinert pipe.

DETAILED DESCRIPTION OF THE INVENTION

A liquid chromatograph as an example of an analysis device according to the present invention is configured such that constituent elements such as a liquid delivery pump, an injector, a column, and a detector are connected to a bioinert pipe according to the present invention. Hereinafter, the bioinert pipe according to the present invention will be described with reference to the drawings.

Figure 1:
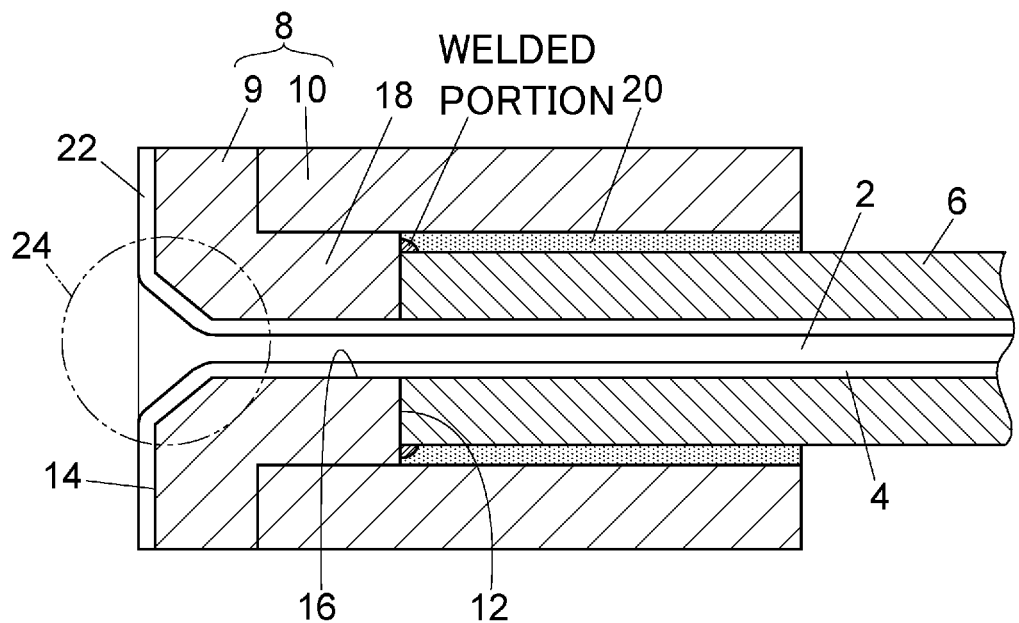
FIG. 1 is a cross-sectional view illustrating a first embodiment of a bioinert pipe.

FIG. 1 is an end portion cross-sectional view of a first embodiment of the bioinert pipe.

The bioinert pipe of the present embodiment has a structure in which an inner wall surface of a flow path 2 for allowing a mobile phase to flow is formed of a resin tube 4, and an outer peripheral surface of the resin tube 4 is covered with a metal tube 6. As to the size of the resin tube 4 and the metal tube 6, for example, the resin tube 4 has an inner diameter of 0.1 mm and an outer diameter of 0.36 mm, and the metal tube 6 has an inner diameter of 0.4 mm and an outer diameter of 0.76 mm. In another mode, for example, the resin tube 4 has an inner diameter of 0.3 mm and an outer diameter of 0.46 mm, and the metal tube 6 has an inner diameter of 0.5 mm and an outer diameter of 0.76 mm.

An end portion extension member 8 is attached to an end portion of the metal tube 6. The end portion extension member 8 is provided to extend an end portion of the metal tube 6 in a direction in which an end surface of the metal tube 6 faces (left direction in the diagram). The end portion extension member 8 is made from a material (for example, stainless steel and hard ceramic) harder than a material (for example, PEEK) of the resin tube 4.

The end portion extension member 8 includes a first member 9 and a second member 10. The first member 9 includes a first surface 12 facing and in contact with an end surface of the metal tube 6, a second surface 14 facing the side opposite to the first surface 12, and a through hole 16 passing from the first surface 12 to the second surface. An inner diameter of the through hole 16 is substantially the same as the inner diameter of the metal tube 6. "Substantially the same" includes not only a case where they are completely the same but also a case where they can be regarded as the same in consideration of manufacturing tolerances.

The first member 9 is welded to the metal tube 6 in a state of being positioned in front of an end surface of the metal tube 6 such that a central axis of the through hole 16 coincides with a central axis of the metal tube 6. A cylindrical portion 18 having the first surface 12 is provided on the metal tube 6 side of the first member 9. An outer diameter of the cylindrical portion 18 is, for example, about 0.8 mm, and is larger than the outer diameter of the metal tube 6. The first member 9 can be formed by machining (for example, shaving from a metal rod).

The second member 10 is a cylindrical member having an inner diameter substantially equal to the outer diameter of the cylindrical portion 18 of the first member 9. The second member 10 is connected to the first member 9 by press-fitting the cylindrical portion 18 of the first member 9 inside a front portion (left side portion in the diagram). A portion to which the cylindrical portion 18 is not press-fitted of the second member 10 covers an outer peripheral surface of an end portion of the metal tube 6. The second member 10 is brazed to the metal tube 6. A layer 20 of a poured brazing material is formed in a gap between an outer peripheral surface of the metal tube 6 and an inner peripheral surface of the second member 10. By providing the second member 10, there is an effect of easily making an inner diameter of the metal tube and an inner diameter of the through hole of the first member coaxial as compared with a case where the first member and the second member are integrated as described later with reference to FIG. 2. This effect can be achieved by performing welding in a state where the inner diameter of the metal tube and the through hole of the first member are coaxially held by a pin gauge or the like. This pin gauge is removed at the time of brazing so that the pin gauge is not brazed by mistake.

The resin tube 4 is inserted into the metal tube 6 and the through hole 16 of the first member 9, and an end portion of the resin tube 4 protruding from the second surface 14 of the first member 9 is bent in a flange shape outward in the radial direction of the flow path 2 to form a flange portion 22. An edge 24 of the through hole 16 on the second surface 14 of the first member 9 has a chamfered tapered shape, and an end portion of the resin tube 4 is bent along the chamfered shape of the edge 24. Note that, in the diagram, the edge 24 of the through hole 16 on the second surface 14 of the first member 9 has a tapered shape. However, the present invention is not limited to this, and the edge 24 may have an R shape or the like.

The flange portion 22 functions as a sealing structure that is pressed against a bottom surface of a connection destination port to maintain liquid tightness of a connection portion when the bioinert pipe is connected to another element. When the bioinert pipe is attached to and detached from the connection destination port, load is applied to an opening portion of the flange portion 22. In a case where the opening portion of the flange portion 22 is bent substantially at a right angle, load at the time of attachment and detachment of the bioinert pipe to and from the connection destination port is concentrated on the portion bent substantially at a right angle, so that the portion is easily broken by repeated attachment and detachment to and from the connection destination port. In contrast, in the present embodiment, since the edge 24 of the through hole 16 on the second surface 14 of the first member 9 is chamfered, and a root portion of the flange portion 22 has a shape along the chamfered shape, the load at the time of attachment and detachment of the bioinert pipe to and from the connection destination port is less likely to be concentrated on a specific portion, and the opening of the flange portion 22 is less likely to be broken by repetition of attachment and detachment to and from the connection destination port.

Figure 2:
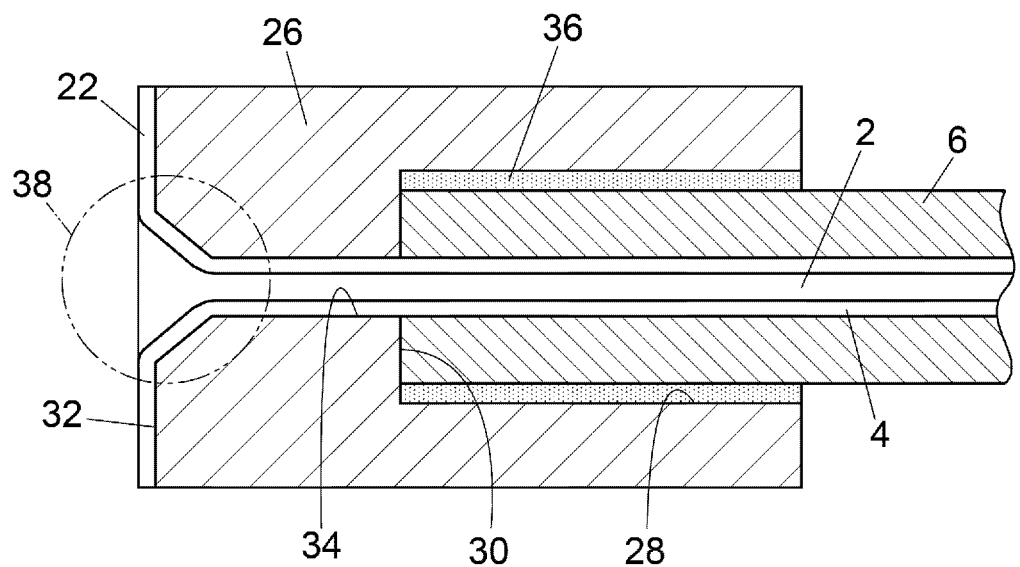
FIG. 2 is a cross-sectional view illustrating a second embodiment of the bioinert pipe.

FIG. 2 is an end portion cross-sectional view of a second embodiment of the bioinert pipe.

The second embodiment is different from the first embodiment in that an end portion extension member 26 attached to an end portion of the metal tube 6 is realized by an integrated sleeve. The end portion extension member 26 includes a recess 28 into which the metal tube 6 is inserted, and a first surface 30 facing and in contact with an end surface of the metal tube 6 is provided at the bottom of the recess 28. A surface of an outer surface of the end portion extension member 26, the surface being located on the side opposite to a surface provided with the recess 28, is a second surface 32 for supporting the flange portion 22 forming a sealing structure, and is provided with a through hole 34 passing to the second surface 32 from the first surface 30. The end portion extension member 26 is brazed with the metal tube 6. A layer 36 of a poured brazing material is formed in a gap between an outer peripheral surface of the metal tube 6 and an inner peripheral surface of the recess 28.

The resin tube 4 is inserted into the metal tube 6 and the through hole 34 of the end portion extension member 26, and an end portion of the resin tube 4 protruding from the second surface 32 of the end portion extension member 26 is bent in a flange shape outward in the radial direction of the flow path 2 to form the flange portion 22. An edge 38 of the through hole 34 on the second surface 32 of the end portion extension member 26 has a chamfered shape similarly to the edge 24 of the through hole 16 in the first embodiment, and an end portion of the resin tube 4 is bent along the chamfered shape of the edge 38. Note that, in the diagram, the edge 38 of the through hole 34 on the second surface 32 of the end portion extension member 26 has a tapered shape. However, the present invention is not limited to this, and the edge 38 may have an R shape or the like.

As described above, it is possible to realize a structure that alleviates concentration of load in the opening portion of the flange portion 22 at the time of attachment and detachment of the pipe regardless of whether the end portion extension member is composed of a plurality of members or an integrated body. In short, it is important to attach the end portion extension member to an end portion of the metal tube 6 and form an edge of an opening on an end surface (second surface) of the end portion extension member into a chamfered shape, and other structures can be optionally changed.

The bioinert pipe described above can be used as a pipe for fluidly connecting elements constituting the liquid chromatograph.

The above embodiments merely exemplify the embodiment of the bioinert pipe according to the present invention, and the embodiment of the bioinert pipe according to the present invention is as described below.

In an embodiment of a bioinert pipe according to the present invention, the bioinert pipe is used in an analysis device and is including a flow path inside, an inner wall of the flow path is composed of a resin tube and an outer peripheral surface of the resin tube is covered with a metal tube. The bioinert pipe includes an end portion extension member attached to an end portion of the metal tube, the end portion extension member is made from a material harder than the resin tube and has a first surface and a second surface, the first surface of the end portion extension member is facing and in contact with an end surface of the metal tube and the second surface is directed opposite to the first surface, a through hole having an inner diameter substantially the same as an inner diameter of the metal tube is provided so as to pass from the first surface to the second surface in the end portion extension member. An edge of the through hole on the second surface of the end portion extension member has a chamfered shape, and the resin tube is inserted into the through hole of the end portion extension member, and an end portion of the resin tube forms a flange portion by being by being bent outward in a radial direction of the flow path along the chamfered shape of the edge of the through hole of the second surface of the end portion extension member.

In a first aspect of the embodiment, the end portion extension member includes a first member and a second member, the first member has two end surfaces which are the first surface and the second surface, and the first member is fixed to the metal tube in a state where a central axis of the through hole coincides with a central axis of the metal tube, and the second member is a hollow cylindrical member covering an outer peripheral surface of the end portion of the metal tube, and is connected with the first member as a part of the first member is press-fitted therein. According to such an aspect, it is possible to provide a structure in which the central axis of the through hole of the end portion extension member and the central axis of the metal tube are reliably made to coincide with each other.

In a second aspect of the embodiment, the end portion extension member is a sleeve that has a recess into which the end portion of the metal tube is inserted, and the first surface which is facing and in contact with the end surface of the metal tube is provided at a bottom of the recess. According to such an aspect, the end portion extension member can be formed at low cost.

In a third aspect of the embodiment, the end portion extension member is made from metal or hard ceramic. This third aspect can be combined with the first aspect or the second aspect described above.

The bioinert pipe of the above aspects can be used as pipes of a liquid chromatograph configured by a plurality of constituent elements fluidly connected via the pipes with each other along a path through which a mobile phase flows.

DESCRIPTION OF REFERENCE SIGNS 2 flow path
4 resin tube
6 metal tube
8, 26 end portion extension member
9 first member
10 second member
12, 30 first surface 14, 32 second surface
16, 34 through hole
18 cylindrical portion of first member
20, 36 layer of brazing material
22 flange portion
24, 38 edge of through hole

What is claimed is:

1. A bioinert pipe used in an analysis device and including a flow path inside, an inner wall of the flow path being composed of a resin tube and an outer peripheral surface of the resin tube being covered with a metal tube, wherein the bioinert pipe comprises an end portion extension member attached to an end portion of the metal tube, the end portion extension member is made from a material harder than the resin tube and has a first surface and a second surface, the first surface of the end portion extension member is facing and in contact with an end surface of the metal tube and the second surface is directed opposite to the first surface, and a through hole having an inner diameter substantially the same as an inner diameter of the metal tube is provided so as to pass from the first surface to the second surface in the end portion extension member, an edge of the through hole on the second surface of the end portion extension member has a chamfered shape, and the resin tube is inserted into the through hole of the end portion extension member, and an end portion of the resin tube forms a flange portion by being bent outward in a radial direction of the flow path along the chamfered shape of the edge of the through hole of the second surface of the end portion extension member, wherein the end portion extension member includes a first member and a second member, the first member has two end surfaces which are the first surface and the second surface, and the first member is fixed to the metal tube in a state where a central axis of the through hole coincides with a central axis of the metal tube, and the second member is a hollow cylindrical member covering an outer peripheral surface of the end portion of the metal tube, and is connected with the first member as a part of the first member is press-fitted therein.

2. The bioinert pipe according to claim 1, wherein the end portion extension member is made from metal or hard ceramic.

3. A liquid chromatograph configured by a plurality of constituent elements fluidly connected via pipes with each other along a path through which a mobile phase flows, wherein each pipe is the bioinert pipe according to claim 1.

* * * * *